UNITED STATES PATENT OFFICE.

MAX E. MUELLER, OF YOUNGSTOWN, OHIO.

PROCESS FOR EXTRACTING CYANIDES FROM GASES.

1,413,762. Specification of Letters Patent. Patented Apr. 25, 1922.

No Drawing. Application filed June 23, 1920. Serial No. 391,217.

*To all whom it may concern:*

Be it known that I, MAX E. MUELLER, a citizen of the United States, and a resident of Youngstown, county of Mahoning, and State of Ohio, have invented a new and useful Improvement in Processes for Extracting Cyanides from Gases, of which the following is a specification, the principle of the invention being herein explained and the best mode in which I have contemplated applying that principle, so as to distinguish it from other inventions.

As is well known, the prevailing commercial process for the removal of cyanogen from coal gas is that illustrated, for example, in the operations of the British Cyanides Company, which consists in washing the gas with ammoniacal liquor in combination with sulphur. As a result the ammonium sulphide present in the liquor dissolves the sulphur to form a polysulphide which reacts with the hydrocyanic acid in the gas and forms ammonium sulphocyanide ($NH_4CNS$). The object of the present invention is to provide a method for extracting cyanides from gases, in the form of an alkaline cuprocyanide, and to recover the latter as such or to convert the same into other desirable compounds.

To the accomplishment of the foregoing and related ends, the invention, then, consists of the steps hereinafter fully described and particularly pointed out in the claims, the following description setting forth but several of the various ways in which the principle of the invention may be utilized.

I have found that if a gas such as that obtained from the carbonization of coal, which contains hydrocyanic acid and hydrogen sulphide, is treated with an alkaline solution such as sodium carbonate carrying in suspension a compound of copper, such as copper carbonate, the copper will gradually pass into solution with the absorption of the hydrocyanic acid from the gas. Expressed as chemical equations the reactions probably are as follows:—

(1) $CuCO_3 + H_2S = CuS + H_2O + CO_2$;

and (2) $2CuS + 2Na_2CO_3 + 8HCN =$
   $2Na_2Cu(CN)_3 + 2H_2S +$
   $2CO_2 + (CN)_2 + 2H_2O.$ According to the above, when using a cupric compound such as copper carbonate, a portion of the cyanogen is lost. However, by the use of a cuprous compound, such as cuprous oxide, $Cu_2O$, no cyanogen is lost, the cuprous sulphide formed in this case reacting as follows:—

(3) $Cu_2S + 2Na_2CO_3 + 6HCN =$
   $2Na_2Cu(CN)_3 + H_2S + 2CO_2 + 2H_2O.$

The loss of cyanogen can also be avoided by using a cupric compound in the presence of metallic copper, the reaction then being:—

(4) $CuS + Cu + 2Na_2CO_3 + 6HCN =$
   $2Na_2Cu(CN)_3 + H_2S + 2CO_2 + 2H_2O.$

Furthermore metallic copper without any other copper compound may be used, since the gases in question, containing hydrocyanic acid and hydrogen sulphide, generally also contain a small percentage of oxygen, which under the conditions will oxidize the metallic copper and the reaction will take place as with a cuprous compound present.

In the above reactions sodium carbonate is used as the alkali to illustrate the nature of the reaction, but it will be understood that other alkaline compounds, such as the carbonate or hydrate of any alkali or alkaline earth metal, may be substituted for sodium carbonate, or, if the gas contains ammonia, this ammonia may serve as the alkali.

The solution of di-sodium copper cyanide, $Na_2Cu(CN)_3$, or other alkaline copper cyanide obtained by the foregoing process generally contains an excess of alkaline carbonate with some free hydrogen sulphide and carbon dioxide. From this solution a variety of commercial products may be prepared, of which the following examples may be given by way of illustration, viz:—

*Example I.*—To obtain di-sodium copper cyanide as such from the solution, the solution is first concentrated, this concentration being preferably carried out under a vacuum until all hydrogen sulphide has been expelled, so as to avoid a partial decomposition of the di-sodium copper cyanide. After the hydrogen sulphide is expelled the concentration may continue under atmospheric pressure without danger of decomposition. From the concentrated solution the di-sodium copper cyanide is crystallized and the mother liquor, after the addition of copper carbonate or other compound of copper and sodium carbonate, may be again used for extracting hydrocyanic acid from the gas.

*Example II.*—The solution of di-sodium copper cyanide as above may be converted to mono-sodium copper cyanide, $NaCu(CN)_2$, by adding a copper compound, such as copper carbonate or cuprous oxide, and thereupon heating. If a cupric compound, such as copper carbonate, is used, it is preferable to also add some metallic copper. With copper carbonate alone the reaction takes place as follows:—

(5) $6Na_2Cu(CN)_3 + 2CuCO_3 =$
$8NaCu(CN)_2 + 2Na_2CO_3 + (CN)_2;$ while with the addition of metallic copper the loss of cyanogen is avoided thus:—

(6) $4Na_2Cu(CN)_3 + CuCO_3 + Cu =$
$6NaCu(CN)_2 + Na_2CO_3.$

At the same time any sulphide present will be precipitated as copper sulphide.

The resulting solution of mono-sodium copper cyanide and sodium carbonate may be concentrated and the mono-sodium copper cyanide crystallized out. The mother liquor consisting of sodium carbonate and mono-sodium copper cyanide may then be returned to the liquor used for treating the gas, where the hydrogen sulphide in the gas will decompose the mono-sodium copper cyanide to di-sodium copper cyanide and copper sulphide which latter, with the aid of the sodium carbonate present, absorbs more hydrocyanic acid, probably, in accordance with the following equation:—

(7) $6NaCu(CN)_2 + H_2S + Na_2CO_3 =$
$4Na_2Cu(CN)_3 + Cu_2S + CO_2 + H_2O.$

*Example III.*—The solution of di-sodium copper cyanide may be converted into a mixture of alkali copper cyanide and alkali zinc cyanide. By heating the solution of di-sodium copper cyanide with a compound of zinc, such as zinc carbonate or zinc oxide, the zinc carbonate or oxide will dissolve and the solution will contain a mixture of sodium copper cyanide and sodium zinc cyanide, whereupon, by evaporating the solution a mixture of these salts may be obtained.

*Example IV.*—The solution of di-sodium copper cyanide may be converted to copper cyanide by the addition of a copper salt such as copper sulphate, together with a reducing agent such as metallic copper or sulphur dioxide, and neutralizing the alkali present. It is preferable to remove the hydrogen sulphide present in the di-sodium copper cyanide solution by boiling before adding the copper sulphate, in order that the resulting copper cyanide shall not be contaminated with copper sulphide. The reaction here occurring may be represented by the following equation:—

(8) $Na_2Cu(CN)_3 + 2CuSO_4 + SO_2 + 2H_2O =$
$3CuCN + Na_2SO_4 + 2H_2SO_4.$

*Example V.*—The solution of di-sodium copper cyanide may be treated for the production of hydrocyanic acid and alkali cyanide. For this milk of lime is preferably added to the di-sodium copper cyanide solution to precipitate the carbonates as calcium carbonate. The latter is then separated from the solution by settling or filtration and the solution distilled with a dilute acid such as sulphuric acid. Hydrocyanic acid is liberated and may be condensed as a liquid or absorbed in caustic alkali to produce an alkali cyanide. The residue of copper cyanide and copper sulphide remaining in the still is separated from the solution of sodium sulphate and used again, with the addition of sodium carbonate, to absorb hydrocyanic acid from the gas.

In case the ammonia in the gas takes the place of sodium carbonate as the necessary alkali in extracting the hydrocyanic acid, and it is desired to produce hydrocyanic acid or alkali cyanide, the solution of ammonium copper cyanide obtained in the extraction process may be freed from carbonates and sulphides by heating instead of using milk of lime. Or, the solution may first be treated with copper cyanide, which precipitates any sulphide present according to the equation, (9) $(NH_4)_2S + 2CuCN =$
$(NH_4)_2Cu(CN)_3 + Cu_2S;$ whereupon the solution may be freed from carbonates by heating. Then, on distilling with dilute sulphuric acid, the ammonia will be converted to ammonium sulphate and the copper to copper cyanide, approximately two-thirds of the cyanogen being driven off as hydrocyanic acid. This solution of ammonium sulphate carrying copper cyanide in suspension may be used for extracting more cyanide and ammonia from the gas. After repeated use the concentration of the ammonium sulphate will increase and when sufficiently high the solution of ammonium sulphate is separated from the copper cyanide and evaporated to recover the ammonium sulphate.

The reactions involved in extracting hydrocyanic acid from the gas as ammonium copper cyanide and converting this into hydrocyanic acid and ammonium sulphate are as follows:

(10) $Cu_2S + 4NH_3 + 6HCN =$
$2(NH_4)_2Cu(CN)_3 + H_2S.$

(11) $(NH_4)_2Cu(CN)_3 + H_2SO_4 =$
$CuCN + (NH_4)_2SO_4 + 2HCN.$

(12) $CuCN + 2NH_3 + 2HCN =$
$(NH_4)_2Cu(CN)_3.$

From the foregoing description it will be seen that my improved method or process not only presents numerous advantageous features in connection with the direct recovery of the cyanogen from the gas, but also that the compound, viz. di-sodium copper cyanide or equivalent alkaline copper cyanide, in which form such cyanogen is recovered, is readily adaptable by suitable treatment for the formation of a large number and variety of commercial products.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of extracting cyanides from gases, which consists in bringing the latter into contact with an alkaline solution carrying a compound of copper in suspension.

2. The method of extracting cyanides from gases, which consists in bringing the latter into contact with an alkaline solution carrying a cuprous compound in suspension.

3. The method of extracting cyanides from gases, which consists in bringing the latter into contact with an alkaline solution carrying cuprous oxide in suspension.

4. The method of extracting cyanides from gases, which consists in bringing the latter into contact with a solution of an alkaline carbonate carrying a compound of copper in suspension.

5. The method of extracting cyanides from gases, which consists in bringing the latter into contact with a solution of sodium carbonate carrying a compound of copper in suspension.

6. In a method of extracting cyanides from gases containing hydrocyanic acid, the step which consists in reacting upon such acid with an alkaline solution carrying a copper compound in suspension whereby a double cyanide of copper and an alkali metal or alkaline-earth is produced.

7. In a method of extracting cyanides from gases containing hydrocyanic acid, the step which consists in reacting upon such acid with a solution of sodium carbonate carrying a copper compound in suspension whereby a double cyanide of copper and sodium is produced.

8. In a method of extracting cyanides from gases containing hydrocyanic acid, the step which consists in reacting upon such gases with a solution of sodium carbonate carrying cuprous oxide in suspension whereby a di-sodium copper cyanide is produced.

9. In a method of extracting cyanides from gases containing hydrocyanic acid and ammonia, the steps which consist in treating such gases with a liquid containing a compound of copper in suspension, whereby a solution containing a double ammonium copper cyanide is formed, removing from said solution any sulphide by addition of copper cyanide and removing carbonates by heating and then distilling the solution with dilute sulphuric acid to drive off the hydrocyanic acid, and using the residue of copper cyanide remaining from said distillation, to extract more hydrocyanic acid and ammonia from the gas.

Signed by me, this 22nd day of June, 1920.

MAX E. MUELLER.